UNITED STATES PATENT OFFICE.

RUSSELL WILLIAM MUMFORD, OF NEW YORK, N. Y., ASSIGNOR TO REFINING PRODUCTS CORPORATION, OF WILMINGTON, DELAWARE, A CORPORATION OF DELAWARE.

MAKING GLUE AND THE LIKE.

1,289,053.  Specification of Letters Patent.  Patented Dec. 24, 1918.

No Drawing.  Application filed June 30, 1917.  Serial No. 177,858.

*To all whom it may concern:*

Be it known that I, RUSSELL WILLIAM MUMFORD, a citizen of the United States, residing at New York, in the county of New York and State of New York, have invented certain new and useful Improvements in Making Glue and the like, of which the following is a specification.

This invention relates to making glue and the like; and it comprises a method of making light colored, transparent and high grade materials of the nature of glue or gelatin, being particularly applicable to the manufacture of glue, gelatin and allied products from bones, tendons, ligaments, skins and other material of animal origin, although also applicable to the manufacture of analogous products from gelatinous or gelatigenous material of vegetable origin, such as Irish moss, algin, and other seaweed materials, various lichens, such as Iceland moss, etc., wherein gelatinous solutions are formed from the raw material in the usual ways and such solutions are treated with a decolorizing carbon capable of adsorbing and removing coloring matters and also, advantageously capable of flocculating or separating suspended or quasi-suspended matter, such decolorizing carbon being best, in order to secure both functions, a particular open-textured porous rather coarse material produced by slow carbonization of various vegetable matters in the presence of only about sufficient oxidizing gases to keep the pores open, and representing approximately the original cellular structure of the material from which such carbon was made, such treatment with the carbon being accompanied or not, as may be desired, with a treatment with kieselguhr, the mixture of solution and carbon being agitated for some time, the carbon separated by use of filter presses, etc., and the bright decolorized liquid being thereafter concentrated to dryness or to such density as required, the treatment with carbon being the only purifying treatment used or other and usual purifying reagents, such as alum, being also used, as may be desired; all as more fully hereinafter set forth and as claimed.

In a general way, glue, gelatin and isinglass may be said to be much the same thing, differing mainly as regards purity; that is, as regards color, taste and transparency. The manufacturer is precluded using any very thoroughgoing or drastic purification by the nature of the material; and the purity and commercial grade of his product depends more or less closely upon the purity of his raw material; that is, the grade of material made depends upon the grade of raw material used. It is not ordinarily practicable to make any high grade product from a low-grade raw material.

In making glue, bones are ordinarily degreased by boiling with water, steaming under pressure, extracting with solvents, etc. Generally speaking, about 40 per cent. of the degreased bones can be obtained in the form of glue liquor. The glue liquors usually produced are however very impure and a number of chemicals have been proposed for clarification. The liquor is often boiled with an alum solution (potash alum is usually employed); about 0.5 per cent. of alum, calculated on the dry glue, being a good proportion. After clarification the glue liquors are jellied, cut or cast and dried. The commercial grade of glue depends largely on the quality of the bones used.

In making bone gelatin from white and selected bones, frequently the mineral matter is preliminarily removed by a treatment with hydrochloric acid, phosphoric acid, sulfurous acid, etc. These acids dissolve the tricalcium phosphate and leave what is known as the ossein. The crushed bones are first degreased and then treated with the acid. Or the fat may be removed in the subsequent boiling of the ossein to make a gelatin solution. Hydrochloric acid is the acid usually employed for removing the mineral matter of the bones. After steeping, the acid and mineral matters are thoroughly removed by soaking and draining. The next operation is frequently a bleaching treatment with sulfurous acid. The extracted animal matter is now placed in digesters, to make a gelatinous solution. Care should be taken not to have the temperature in this operation rise above 185° F.; otherwise the color of the product will be unduly dark.

Two or three digestions must be made in order to recover the maximum amount of gelatin. These gelatin liquors are clarified with a small amount of alum and are then concentrated to a jellying strength.

The function of the alum solution in purifying glue and gelatin liquors is to produce a precipitate which carries down some of the suspended matter, thereby adding to the clearness of the final product. It has other purifying actions but this is an important one. The clarification is at best only partial.

The process of making gelatin from hides is practically the same as that above discussed, except of course there is no preliminary treatment with acid to remove mineral matters. The hides are often given a steep in solutions of lime or of caustic soda. Afterward, and before digestion, the hides are washed free of alkali. They may then be bleached to remove any objectionable coloring matters. The quality of the glue or gelatin produced depends upon the quality of the hides.

Sometimes, in the effort to obtain whiter products, the glue or gelatin liquor obtained in any of the ways described are subjected to various bleaching agents. As any bleaching of a color, as distinguished from the removal of that color, is apt to be a transitory matter, these bleaching methods are not particularly effective in producing permanently decolorized goods. It must be remembered that the glue substance itself is very sensitive to chemical change and any violent chemical action is apt to affect the properties of the glue or gelatin upon which its value depends; its viscosity and strength.

The greater is the transparency of glue and gelatin, the higher is the market value; and the same is true as regards lightness of color. Transparency, however, depends largely upon the absence of suspended impurities; and it is in practice difficult to remove suspended matters from such a viscous liquid as a solution of glue. As stated, the alum treatment effects this removal ordinarily only in part.

I have found that I can effect an important improvement in the art of making glue and gelatin by the expedient of using a carbon decolorant in the course of the operation. Advantageously, this carbon decolorant has the power of collecting suspended matter. In so doing, I am able to obtain finished materials of higher grade than that represented by the grade of the raw materials I employ; something which, as stated is not ordinarily practicable.

While many of the commercial carbon purifying agents may be employed for my purposes, I find that the best results are obtained by the use of a special decolorant having not only decolorizing power but the power, as stated, of collecting insoluble matters. Such a decolorant I can produce by a special method of charring vegetable matters, such as peat or sawdust, as more fully set forth in my copending application, Serial No. 169,971. Briefly stated, the method as disclosed in the said application in an advantageous embodiment, is to treat peat or sawdust or other vegetable matter with a highly colloid material, like starch, in the event that such vegetable material does not already contain a sufficient amount of colloid matter. The vegetable material in a granulated form is then mixed with grains of a material such as dolomite, adapted to act as a spacing agent and also to evolve carbon dioxid or other purifying gas continuously throughout a wide temperature range. The mixture is then slowly heated in a vented retort. Under the action of the heat, the moisture is first expelled, taking with it various volatile matters and puffing up the vegetable material and rendering it porous. Then the material chars slightly, giving off various vapors and gases. Because of the presence of the mineral spacing agent, these vapors and gases are afforded an opportunity to escape without in their turn undergoing decomposition in the presence of the grained vegetable matter. As the charring goes on the dolomite begins to evolve carbon dioxid at a temperature somewhere around 250° C. This carbon dioxid is taken up in the pores of the charring mass and as the temperature goes up, it exercises a beneficial action on these pores, probably by opening them up. The temperature is then carried to a high point and the material is dumped into water and washed. The ultimate material is a granular carbon having open pores representing, more or less closely, the cellular structure of the original material before carbonization. It is vastly more open-textured than charcoal in which, in the usual methods of making charcoal, the pores are closed and sealed by the deposition of carbon in them. When wood is first charred in making charcoal, the vapors and gases accumulate in the pores where they are in turn carbonized, depositing carbon and closing the pores. This is desirable in making charcoal where a hard, dense product is wanted. In the present material, the effort is to have open pores.

This material unites a number of properties. It has a large surface area of a form of carbon which is very active in adsorbing or removing coloring matters from solution; being unusually active in this way.

In addition, this material has the property possessed by kieselguhr and some other highly porous mineral matters of collecting or flocculating suspended solids. In other words, this particular material unites the property of decolorizing with that of removing suspended solids. This union of properties renders it unusually useful in the case of glue and gelatin solutions, since it not only advances their grade by removing coloring matter but also by increasing the transparency. Glue solutions are viscous and thick and it is therefore difficult to remove suspended matters by other methods; but this is done in the present method.

In a practical embodiment of this invention in making glue from bones, I boil the bones as usual to form a thick liquor. This liquor may be a glue liquor or a gelatin liquor, as the case may be, and may be produced in any of the ways hereinbefore described. The thick liquid I may, or may not, treat with alum and boil for the purpose of clarification. Prior to the treatment with alum, or subsequent thereto, but more advantageously subsequent thereto, I add a small proportion of a carbon decolorant which is most advantageously the special carbon described, using ordinarily 5 to 20 per cent. on the weight of the dry glue contained in the solution. The reason that the decolorant is best used subsequent to the alum precipitation (where the latter is employed) is, of course, that in so doing the decolorant is not clogged by the materials precipitated by the alum treatment which would render its recovery and subsequent revivification more difficult. After adding the decolorant the liquor is vigorously stirred or otherwise well agitated for 10 to 20 minutes. After 10 to 20 minutes contact with my decolorant, the solution is sent through filter presses and the resulting glue or gelatin liquors will be found to be bright and sparkling, most of the color and all, or most, of the suspended impurities having been removed by the action of my decolorant.

The decolorant is held back in the filter press as a press cake. The cake is washed with hot water until all adherent glue solution is washed out; the decolorant is then washed with a dilute solution of caustic soda, followed by a washing with a dilute acid, and it is then thoroughly washed with water; when the decolorant is ready for use again either wet or dry.

My method of treatment is exactly the same in purifying gelatin solutions made from bones or hides or ligaments. The decolorant is added in the same way to the liquors prepared from the materials which have been treated with acid, etc.

In these treatments I have found it a useful expedient to add a small percentage of kieselguhr at times, either after the treatment with the decolorant is complete, or together with the decolorant. Or I may use a little kieselguhr in the filter presses.

Isinglass is the purest form of commercial gelatin and is obtained from the swimming bladder of various kinds of fish and particularly sturgeon. Some commercial grades of what is called isinglass are however made from different materials. My process may also be employed in its purification, as above described.

Size is substantially an undried glue solution. My process may be employed in its purification in the same way as above described. The only difference is that the thick evaporated liquor is not set and dried but is marketed as such.

In making colored glues and gelatin, the present process is particularly applicable. In such preparations, opacity is very disadvantageous and the presence of the natural dull yellows and browns of the glue and gelatin militates against the brightness and truth of the dyes added.

As color is a very important item, greatly affecting the price of glues, gelatins, etc., in the usual methods of manufacture the clarified liquors are often bleached. This is done by some manufacturers during the clarification and by others, after concentration has been completed. Sulfurous acid is the bleaching agent generally employed for this purpose. Bleaching with sulfurous acid however is seldom permanent; the color tends to reappear.

In the stated operation of my process the coloring matters of the glue, gelatin and allied products are not bleached but are actually physically removed. The decolorized material does not therefore "go off," as is the case with materials in which the color has been lightened with the aid of chemicals. My material of course exercises no chemical action on the glue substance and does not deleteriously affect its properties as do most of the bleaching agents known.

While I have described my invention more particularly in its application to the manufacture of glue and gelatin from animal materials, yet it may be advantageously employed in the manufacture of a number of similar gelatinous materials of vegetable origin, such as algin, Iceland moss, Irish moss, agar-agar, etc. My decolorant may be used in treating the thick solutions of vegetable origin in the same way as has been indicated for glue solution.

What I claim is:—

1. In the manufacture of clear and decolorized gelatinous products, the process which comprises producing a solution of a gelatinous material, adding decolorizing carbon, agitating the mixture vigorously, separating the carbon and further concentrating the gelatinous solution.

2. In the manufacure of clear and decolorized gelatinous products, the process which comprises producing a solution of a gelatinous material, adding a porous, open-textured vegetable carbon having pores representing approximately the original cellular structure of the material from which it was made, agitating the mixture vigorously, separating the carbon and further concentrating the gelatinous solution.

3. In the manufacture of glue and allied products, the process which comprises bringing animal matter into solution to form a thick liquid, mixing said gelatinous solution with a decolorizing carbon, agitating the mixture vigorously, separating the carbon and further concentrating the gelatinous solution.

4. In the manufacture of glue and allied products, the process which comprises bringing animal matter into solution to form a thick liquid, mixing said gelatinous solution with a porous, open-textured vegetable carbon having pores representing approximately the original cellular structure of the material from which it was made, agitating the mixture vigorously, separating the carbon and further concentrating the gelatinous solution.

5. In the manufacture of clear and decolorized gelatinous products, the process which comprises producing a solution of a gelatinous material, adding a decolorizing carbon, a little kieselguhr being also added, agitating the mixture vigorously, separating the carbon and further concentrating the gelatinous solution.

6. In the manufacture of clear and decolorized gelatinous products, the process which comprises producing a solution of a gelatinous material, adding a porous, open-textured vegetable carbon having pores representing approximately the original cellular structure of the material from which it was made, a little kieselguhr being also added, agitating the mixture vigorously, separating the carbon and further concentrating the gelatinous solution.

7. In the manufacture of glue and similar materials, the process which comprises bringing animal matter into solution to form a gelatinous liquid, mixing said gelatinous liquid with a decolorizing carbon, a little kieselguhr being also added, agitating the mixture vigorously, separating the carbon and further concentrating the gelatinous solution.

8. In the manufacture of glue and similar materials, the process which comprises bringing animal matter into solution to form a gelatinous liquid, mixing said gelatinous liquid with a porous, open-textured vegetable carbon having pores representing approximately the original cellular structure of the material from which it was made, a little kieselguhr being also added, agitating the mixture vigorously, separating the carbon and further concentrating the gelatinous solution.

In testimony wherof, I affix my signature hereto.

RUSSELL WILLIAM MUMFORD.